(12) United States Patent
Mizrahi

(10) Patent No.: US 6,373,609 B1
(45) Date of Patent: Apr. 16, 2002

(54) WAVELENGTH TAILORED DISPERSION COMPENSATION APPARATUS

(75) Inventor: Victor Mizrahi, Columbia, MD (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 09/098,116

(22) Filed: Jun. 16, 1998

(51) Int. Cl.[7] .............................................. H04B 10/00
(52) U.S. Cl. ........................................ 359/161; 359/124
(58) Field of Search ................................. 359/124, 161, 359/127, 173, 130, 128, 188; 385/37

(56) References Cited

U.S. PATENT DOCUMENTS

| 4,405,199 A | | 9/1983 | Ogle et al. ................ 350/96.19 |
| 5,467,213 A | | 11/1995 | Kazuhisa et al. ............ 359/175 |
| 5,608,562 A | * | 3/1997 | Delavaux et al. ............ 359/161 |
| 5,696,614 A | | 12/1997 | Ishikawa et al. ............. 359/124 |
| 5,701,188 A | * | 12/1997 | Shigematsu et al. ......... 359/161 |
| 5,726,784 A | * | 3/1998 | Alexander et al. ........... 359/125 |
| 5,815,296 A | * | 9/1998 | Kubota ......................... 39/133 |
| 5,841,918 A | * | 11/1998 | Ll ................................. 385/24 |
| 5,877,879 A | * | 3/1999 | Naito .......................... 359/133 |
| 6,055,081 A | * | 4/2000 | Koyano et al. .............. 359/161 |
| 6,137,604 A | | 10/2000 | Bergano ...................... 359/124 |
| 6,169,616 B1 | * | 1/2001 | Cao ............................ 359/130 |

FOREIGN PATENT DOCUMENTS

| EP | 0917312 | 5/1999 |
| FR | 2756995 | 12/1998 |
| GB | 2309131 | 9/1997 |
| GB | 2319419 | 5/1998 |

OTHER PUBLICATIONS

Otani et al., "Wavelength Demultiplexer for Sub–nm Channel Optical Amplifier WDM System," IEEE/LEOS 1996 Summer Topical Meeting–Advanced Applications of Lasers in Materials and Processing,Conference Dates Aug. 5–9, 1996, New York, NY.

* cited by examiner

*Primary Examiner*—Jason Chan
*Assistant Examiner*—Christina Y Leung
(74) *Attorney, Agent, or Firm*—David L. Soltz; Daniel N. Daisak; Michael R. Cammarata

(57) ABSTRACT

An optical device is provided which separates one or more optical channels from a plurality of optical channels, each at a respective wavelength, and provides a length of dispersion compensating fiber for the one or more separated optical channels.

3 Claims, 3 Drawing Sheets

WAVELENGTH TAILORED DISPERSION COMPENSATION APPARATUS

FIELD OF INVENTION

The present invention generally relates to optical communication systems and more particularly to an apparatus for providing tailored multiple wavelength dispersion compensation.

BACKGROUND OF INVENTION

Wavelength division multiplexing (WDM) is a technique for increasing the capacity of existing fiber optic networks by transmitting a plurality of channels over a single waveguide medium. WDM systems typically include a plurality of transmitters for transmitting modulated information signals on a designated one of a plurality of optical channels or wavelengths. The transmitters used in WDM systems typically include semiconductor lasers each transmitting on a designated one of a plurality of wavelengths. The selected wavelengths are usually within the 1.55 μm range which corresponds to an absorption minimum associated with silica-based fibers. The channels are combined by a multiplexer at a first terminal and transmitted to a demultiplexer at a receiving terminal along a transmission fiber. One or more amplifiers may be positioned along the transmission fiber to optically amplify the transmitted signals. The demultiplexer separates the optical channels and supplies them to receiving circuitry which converts the optical signals into electrical signals for processing. Dense WDM (DWDM) systems are also employed with this same general construction, but have a greater number of optical channels, typically with smaller channel spacings.

The use of optical amplifiers in these types of systems solves the loss problem associated transmission over optical fiber, but does not solve the chromatic dispersion problem. Dispersion generally refers to the broadening of a transmitted pulse as it propagates down an optical fiber. Group velocity dispersion (GVD) is a parameter that expresses how much an optical pulse broadens when propagating inside an optical fiber and is expressed in units of ps/(km-nm). For "standard" single mode optical fiber, the zero-dispersion wavelength $\lambda_{ZD}$ is≈1.31 μm while a typical dispersion value for a wavelength in the 1.55 μm range transmitted along the same "standard" single mode fiber is 17 ps/(km-nm). As the pulses spread, they can overlap and interfere with each other, thereby impacting signal integrity. The effect becomes more pronounced at higher data rates. Pulses at different wavelengths typically suffer different amounts of dispersion. Therefore, in WDM systems where a plurality of channel wavelengths propagate along a single optical fiber, pulses at their respective wavelengths broaden at different rates. If multiple amplifiers are disposed along an optical fiber to accommodate long-haul signal transmission, the effects of dispersion on the transmitted signal accumulate over the path further impacting signal integrity.

Dispersion compensating fiber is a specialty optical fiber used to compensate for these dispersive effects encountered during signal transmission. Basically, the specialty fiber has a dispersion characteristic of opposite sign to the optical fiber used for transmission. Exemplary types of dispersion compensating fiber are commercially available from Lucent Technologies and/or Corning, Inc. ("LS" fiber). While dispersion compensating fiber is generally a broadband solution to first order dispersion (dispersion slope), it does not properly compensate for second order dispersion. That is, the optimum length of these specialty fibers varies with channel wavelength. Thus, in a WDM system where multiple wavelengths are transmitted, no one length of dispersion compensating fiber precisely accommodates all channel wavelengths.

To combat the effects of dispersion, some systems utilize dispersion shifted fiber. Dispersion shifted fiber can provide a transmission path with close to zero dispersion, however, it suffers from certain nonlinearities, such as four wave mixing, which affect signal integrity. Four wave mixing is a nonlinear effect that causes a plurality of waves propagating down a fiber at predetermined channel spacings to create a new wave at a particular frequency. This newly created wave causes crosstalk when it interferes with other channels within the signal channel plan. Therefore, with dispersion shifted fiber it is necessary to add back some dispersion to combat the effects of fiber nonlinearities. Accordingly, for transmission over standard optical fiber, dispersion compensating fiber is typically used at the receive end of a system to avoid costly installation of the specialty fiber within the transmission span.

Thus, there is a need to provide a simple and cost effective optical device tailored to provide a length or lengths of dispersion compensating fiber to properly compensate for second order dispersion in communication systems transmitting a plurality of optical channels.

SUMMARY OF INVENTION

The present invention meets these needs and avoids the above-referenced drawbacks by providing an optical device comprising a transmission path capable of carrying a plurality of optical channels, each at a respective wavelength. A wavelength branching element is coupled to the transmission path and is configured to separate at least one of the plurality of optical channels having a particular wavelength from the multiplexed signal. A segment of dispersion compensating optical fiber is coupled to the wavelength branching element. The segment of optical fiber has a length corresponding to the particular wavelength associated with the at least one of the plurality of optical channels.

The foregoing, and other features and advantages of the present invention, will be apparent from the following description, the accompanying drawings and the appended claims.

DETAILED DESCRIPTION

In accordance with the present invention, an optical device is configured to separate one or more optical channels from a plurality of optical channels, each at a respective wavelength, and provides a length of dispersion compensating fiber for the one or more separated optical channels.

Figure 1:
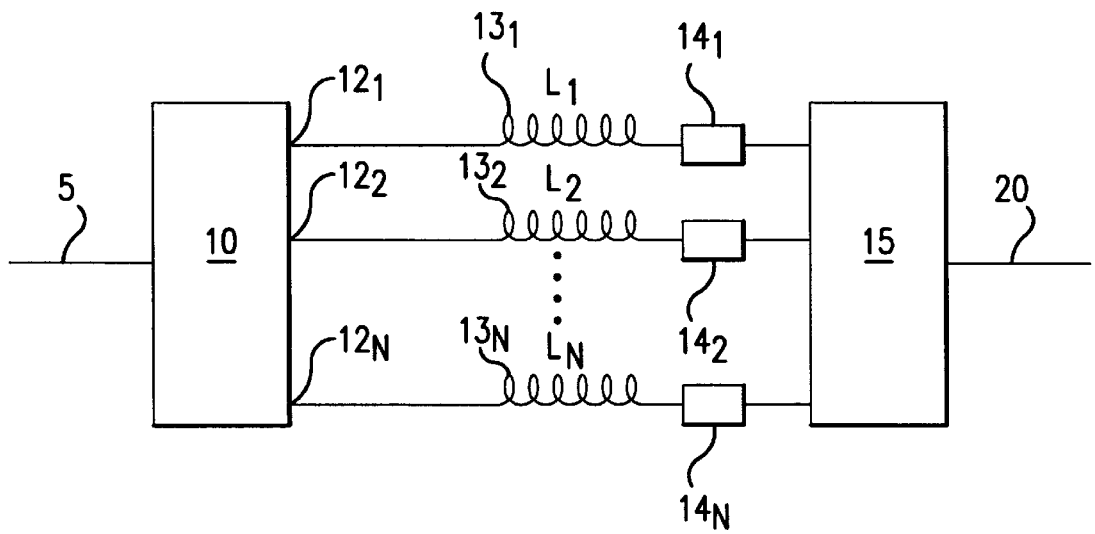
FIG. 1 illustrates a device for providing dispersion compensation using a demultiplexer and a multiplexer in accordance with the present invention.

Turning to the drawings in which like reference characters indicate the same or similar elements, FIG. 1 illustrates a transmission path 5 which carries a plurality of optical channels, each at a respective wavelength $\lambda_1, \ldots \lambda_N$, for example, in the 1550 nm range, to an optical demultiplexer 10. Optical transmission path 5 is typically a single-mode silica-based fiber with a low loss window in the 1550 nm range. However, any optical waveguide which is capable of transporting multiple optical wavelengths can be employed as transmission path 5. Typically, when optical path 5 is used as a long-haul carrier route, transmission path 5 is on the order of hundreds of kilometers long with optical amplifiers spaced approximately every one hundred kilometers, with a range of 30–130 kilometers being exemplary. During transmission over transmission path 5, the transmitted pulses experience dispersion. That is, the transmitted pulses at respective wavelengths $\lambda_1 \ldots \lambda_N$ broaden as they propagate down path 5. Demultiplexer 10 separates each channel from the multiplexed signal received via path 5 and supplies each signal to outputs $12_1 \ldots 12_N$. Each optical channel traverses a segment of dispersion compensating fiber $13_1 \ldots 13_N$ disposed between demultiplexer 10 and multiplexer 15. Each segment of fiber $13_1 \ldots 13_N$ has lengths $L_1 \ldots L_N$ which corresponds to a length for a particular wavelength $\lambda_1 \ldots \lambda_N$; i.e., $L_1$ corresponds to a length of dispersion compensating fiber for wavelength $\lambda_1$, $L_2$ corresponds to a length of dispersion compensating fiber for wavelength $\lambda_2$, etc. Because different lengths of dispersion compensating fiber have different losses associated with them, loss elements $14_1 \ldots 14_N$ may optionally be introduced downstream of fiber segments $13_1 \ldots 13_N$ to equalize these losses. Examples of loss element which can be used include attenuators commercially available from, for example, Gould, JDS Fitel and high loss fiber available, for example, from Lucent Technologies.

After each signal channel traverses the respective segments of dispersion compensating fiber $13_1 \ldots 13_N$ the channels can be combined by multiplexer 15 if this configuration is disposed along a transmission path or in-line to supply the signals to optical path 20 for subsequent transmission. Alternatively, if this configuration is used at the receive end of a communications system, multiplexer 15 can be avoided and each channel wavelength can be supplied to a downstream receiver for further processing. In this manner, each channel within the multiplexed optical signal traverses an associated length of dispersion compensating fiber segment providing a broadband solution.

Figure 2:
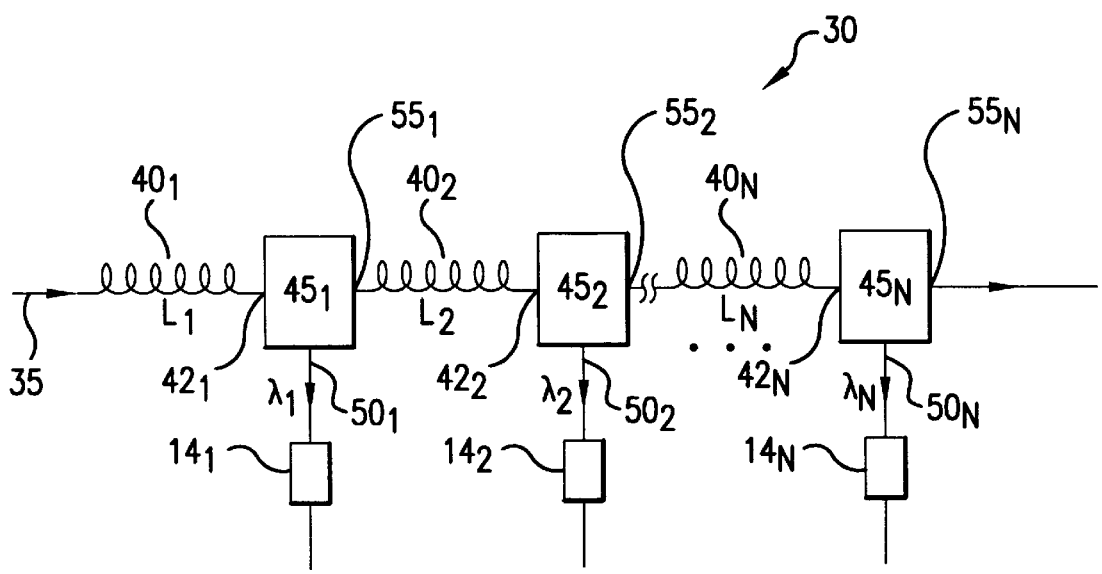
FIG. 2 schematically illustrates an optical device in accordance with the present invention.

FIG. 2 schematically illustrates an alternative embodiment in accordance with the present invention. Optical device 30 includes one or more segments of dispersion compensating fiber $40_1 \ldots 40_N$ disposed between wavelength branching units $45_1 \ldots 45_N$, respectively. Each segment of dispersion compensating fiber $40_1 \ldots 40_N$ has an associated length $L_1 \ldots L_N$ which corresponds to an adequate compensation length for a particular wavelength. Optical device 30 can be disposed at or near a receiving terminal within a communications network where demultiplexing of the transmitted multiplexed signal is performed. If necessary, additional cleanup filters, for example interference filters, may be added for improved demultiplexing.

Optical transmission path 35 is configured to receive an optical signal including a plurality of multiplexed optical channels having wavelengths $\lambda_1 \ldots \lambda_N$. Transmission path 35 is typically a single-mode silica-based fiber having a corresponding absorption minimum in the 1.55 $\mu$m range. However, any optical waveguide which is capable of transporting multiple optical wavelengths can be employed as transmission path 35 in optical system 30. Each of the wavelength branching units $45_1 \ldots 45_N$ receives a multiplexed signal at input ports $42_1 \ldots 42_N$. Each branching unit is configured to select one or more channels having a particular wavelength from the multiplexed channels carried over path 35. The one or more selected channels are supplied to a respective output port $50_1 \ldots 50_N$. Loss elements $14_1 \ldots 14_N$ may optionally be coupled to wavelength branching unit output ports $50_1 \ldots 50_N$ to equalize losses associated with dispersion compensating fiber segments $40_1 \ldots 40_N$. The remaining channels not selected by the respective wavelength branching units $45_1 \ldots 45_N$ are supplied to output ports $55_1 \ldots 55_N$.

To compensate for dispersion experienced during transmission along path 35, segments of dispersion compensating fiber $40_1 \ldots 40_N$ are used. As the multiplexed optical signal having channel wavelengths $\lambda_1 \ldots \lambda_N$ pass through segment of dispersion compensating fiber $40_1$, the optical channels experience dispersion compensation. The multiplexed optical signal is received by wavelength branching unit $45_1$ at input port $42_1$. Wavelength branching unit $45_1$ selects an optical channel having wavelength $\lambda_1$ from the multiplexed optical signal and supplies the selected channel to output port $50_1$. The length $L_1$ of dispersion compensating fiber segment $40_1$ corresponds to a length which adequately compensates for a particular wavelength, for example wavelength $\lambda_1$. The remaining channels having wavelengths $\lambda_2 \ldots \lambda_N$ are supplied to output port $55_1$ of wavelength branching unit $45_1$ and pass to fiber segment $40_2$.

Generally, fiber segments $40_1 \ldots 40_N$ have an associated length $L_1 \ldots L_N$ which, together with the preceding fiber segment length, corresponds to a length of dispersion compensating fiber adequate for a respective wavelength. For example, if wavelength $\lambda_2$ is to be selected by wavelength branching unit $45_2$ and supplied to output port $50_2$, then length $L_1$ of fiber segment $40_1$ together with length $L_2$ of fiber segment $40_2$ sufficiently compensates for wavelength $\lambda_2$. The remaining channels having wavelengths $\lambda_3 \ldots \lambda_N$ are supplied to output port $55_2$. Similarly, if $\lambda_N$ is selected by wavelength branching unit $45_N$, then length $L_1$ of fiber segment $40_1$ together with length $L_2$ of fiber segment $40_2$, together with length $L_N$ of fiber segment $40_N$ sufficiently compensates for optical channel having wavelength $\lambda_N$. Table 1 illustrates exemplary wavelengths and corresponding dispersion compensating fiber lengths $L_1 \ldots L_N$ for transmission over 500 km of non-zero dispersion shifted fiber having $\lambda_0$ at 1515 nm with dispersion slope of 0.08 ps/nm$^2$/km; the exemplary dispersion compensating fiber has dispersion of −100 ps/nm/km with dispersion slope of 0.

TABLE 1

| Transmission Wavelengths | Length of Dispersion Compensating Fiber |
| --- | --- |
| 1540 nm | $L_1$ = 10 km |
| 1550 nm | $L_2$ = 4 km (14 km total:$L_1 + L_2$) |
| 1560 nm | $L_3$ = 4 km (18 km total: $L_1 + L_2 + L_3$) |

The respective lengths of dispersion compensating fiber, for example fiber segments $40_2 \ldots 40_N$, are less than the amount of dispersion compensating fiber needed for optical channels having wavelength $\lambda_2 \ldots \lambda_N$ if the respective wavelengths did not undergo some degree of compensation from downstream fiber segments, e.g., fiber segment $40_1$ having length $L_1$. Each of the optical channels experience the necessary dispersion compensation through fiber segments $40_1 \ldots 40_N$ depending on their wavelengths before being selected or dropped by a wavelength branching unit $45_1 \ldots 45_N$. Thus, optical device 30 provides a broadband dispersion compensating device which uses less dispersion compensating fiber for optical channels having wavelengths $\lambda_1 \ldots \lambda_N$, thereby avoiding the use of excess amounts of costly dispersion compensating fiber.

As can be seen from the above description, the number of wavelength branching units $45_1 \ldots 45_N$ is proportional to the number of optical channels selected from the multiplexed signal, for example within a WDM communications system where each branching unit can select one or more optical channels. Likewise, the number of dispersion compensating fiber segments $40_1 \ldots 40_N$, their lengths $L_1 \ldots L_N$, and the amount of dispersion compensation desired, may depend upon the number of channels to be selected and the wavelengths of each of the selected channels within the system channel plan. In particular, an individual branching unit, for example, $45_2$ can be configured to select more than one channel, e.g. channels having wavelengths $\lambda_2$ and $\lambda_N$. Dispersion compensating fiber segment $40_2$ having length $L_2$ is of a sufficient length, together with fiber segment $40_1$, to compensate adequately for channels having wavelengths $\lambda_2$ and $\lambda_N$ selected by branching unit $45_2$. The fiber segments $40_1$ and $40_2$ may combine to form an optimum length of fiber for a particular channel, e.g., channel having wavelength $\lambda_2$, and an adequate length for another channel, e.g., channel having wavelength $\lambda_N$. In this manner, a group of channels can be selected by a particular branching unit and lengths of dispersion compensating fiber associated with the branching unit can adequately compensate for the channels at their respective wavelengths.

Figure 3:
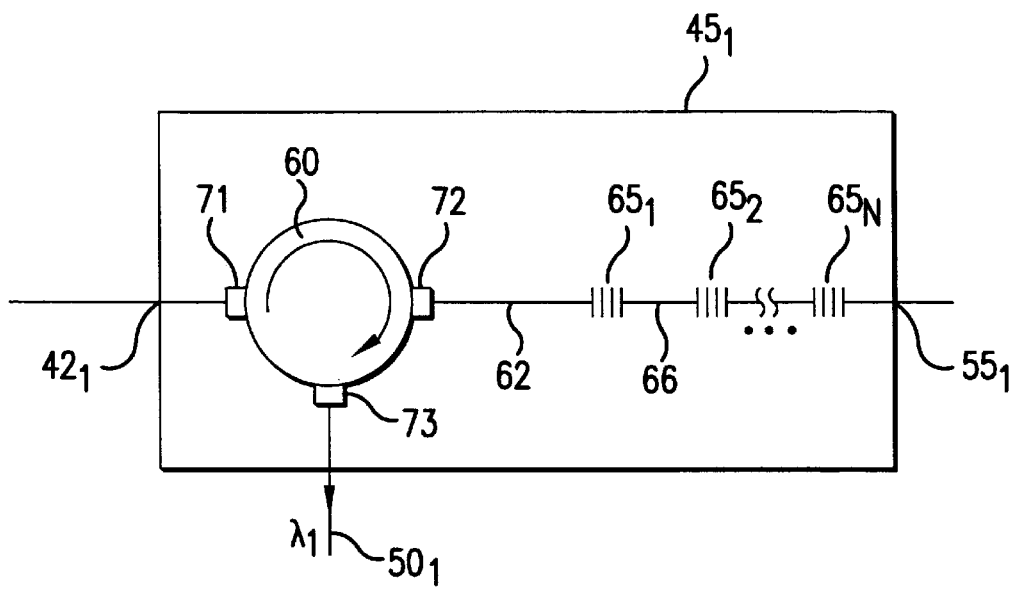
FIG. 3 is a schematic illustration of a wavelength branching unit in accordance with the present invention.

FIG. 3 schematically illustrates a wavelength branching unit $45_1$ as an example of the wavelength branching units $45_1 \ldots 45_N$ in accordance with the present invention. Input port $42_1$ is coupled to transmission path 35 and receives the multiplexed optical signal. An optical transfer element 60, for example an optical circulator, includes first second and third ports 71, 72 and 73, respectively and is configured such that optical signals which enter first port 71 exit through second port 72 and optical signals which enter port 72 exit through third port 73. The first circulator port 71 receives the multiplexed optical signal from optical path 35 and received by wavelength branching unit $45_1$ via port $42_1$. The multiplexed optical signal enters circulator 60 at first port 71 and rotates, in a clockwise direction toward second port 72. The signal exits circulator port 72 and is received by a first filtering element 651, tuned to reflect one or more particular wavelengths. Filtering element $65_1$ is coupled to port 72 by way of optical fiber 62. Filtering element $65_1$ can be, for example, a Bragg grating, or other optical filtering device configured to select one or more wavelengths and allow the non-selected wavelengths to pass-through to line 66. A Bragg grating comprises a series of photoinduced refractive index perturbations in an optical fiber which reflects optical signals within a selected wavelength band and transmits wavelengths outside of the selected wavelength band.

Filtering element $65_1$ is tuned to have a low transmissivity and high reflection characteristic at a particular wavelength, for example $\lambda_1$, and a high transmissivity or pass-through characteristic at wavelengths other than $\lambda_1$. Accordingly, a portion of the multiplexed optical signal having wavelength $\lambda_1$, is reflected by filtering element $65_1$ back to circulator port 2. The reflected portion of the signal travels clockwise in circulator 60 toward circulator port 3 and exits at output 3 onto optical path $50_1$. The portion of the multiplexed optical signal having wavelengths outside of $\lambda_1$ passthrough filtering element $65_1$ to line 66.

Similarly, filtering elements $65_2 \ldots 65_N$ are tuned to have a low transmissivity and high reflection characteristic at particular wavelengths, and a high transmissivity or passthrough characteristic at other wavelengths and can be, for example, Bragg gratings. The remaining wavelengths not selected by filtering elements $65_2 \ldots 65_N$ are supplied to output port $55_1$. In this manner, one or more filtering elements $65_1 \ldots 65_N$ can be employed to select a plurality of wavelengths from the multiplexed optical signal received via path 35.

When filtering elements $65_1 \ldots 65_N$ are Bragg gratings, each grating comprises a series of photoinduced refractive index perturbations in optical fiber 62 which reflects optical signals within a selected wavelength band and transmits wavelengths outside of the selected wavelength band as described above. Bragg gratings suitable for use in wavelength branching units $45_1 \ldots 45_N$ in accordance with the present invention are described in, inter alia, Morey et al., "Photoinduced Bragg Gratings in Optical Fibers," *Optics and Photonics News*, February 1994, pp. 8–14.

When one grating $65_1$ or a small number of gratings are employed, broad chirped gratings may be selected to reflect a large wavelength band. Strong gratings, those that reflect over 95% of the incident wavelength, generally include a significant radiation mode loss band on the short wavelength side of the transmission/reflection spectrum. Radiation mode loss describes optical signal loss due to scattering outside the core of the waveguide, including radiation scattered in the cladding of the waveguide. Consequently, it is desirable to ensure that the optical channels are not located within the radiation mode loss region for the grating. When a series of gratings is used, e.g., $65_1 \ldots 65_N$, the gratings are ordered such that the shortest channel wavelength is reflected first, in order up to the longest channel wavelength. This configuration eliminates the radiation mode loss effects which occur during reflection to port 72 of optical transfer device 60.

Figure 4:
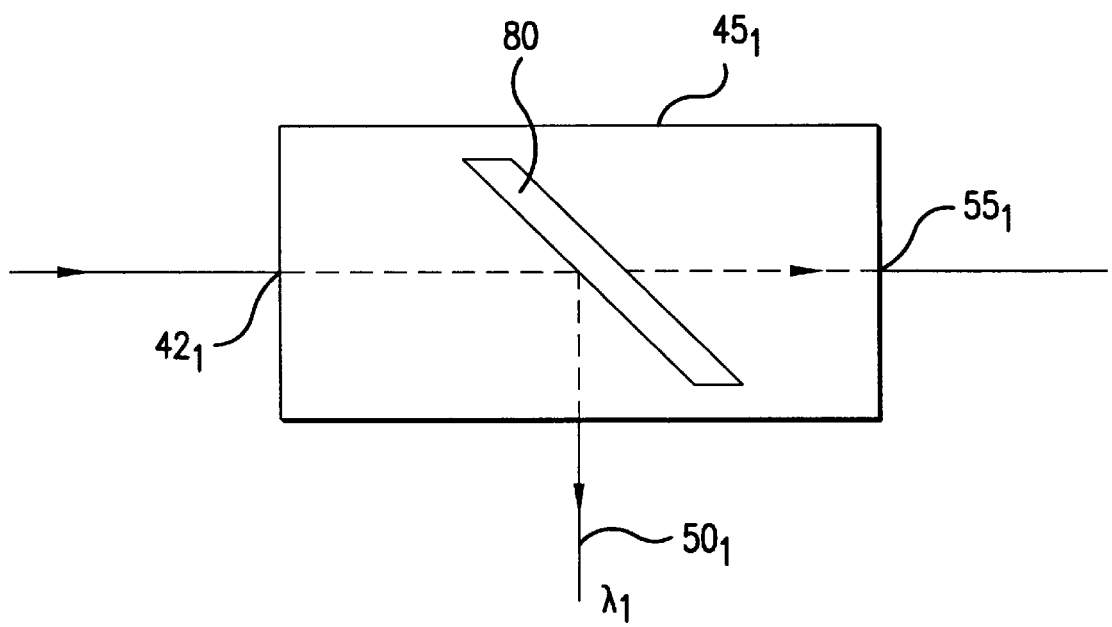
FIG. 4 schematically illustrates an alternative embodiment of a wavelength branching unit in accordance with the present invention.

FIG. 4 schematically illustrates an alternative embodiment of wavelength branching unit $45_1$ as an example of the wavelength branching units $45_1 \ldots 45_N$ in accordance with the present invention. Input port $42_1$ is coupled to transmission path 35 and receives the multiplexed optical signal. Optical filtering element 80 can be, for example, an interference filter configured to select one or more channels from the received multiplexed signal having wavelengths $\lambda_1 \ldots \lambda_N$. By way of example, filtering element 80 reflects at least one optical channel having wavelength $\lambda_1$ and supplies it to optical path $50_1$. The remaining channels having wavelengths $\lambda_2 \ldots \lambda_N$ pass-through filtering element 80 to port $55_1$. It should be understood that each filtering element 80 within wavelength branching units $45_1 \ldots 45_N$ can be configured to select one or more optical channels having wavelengths $\lambda_2 \ldots \lambda_N$.

Figure 5:
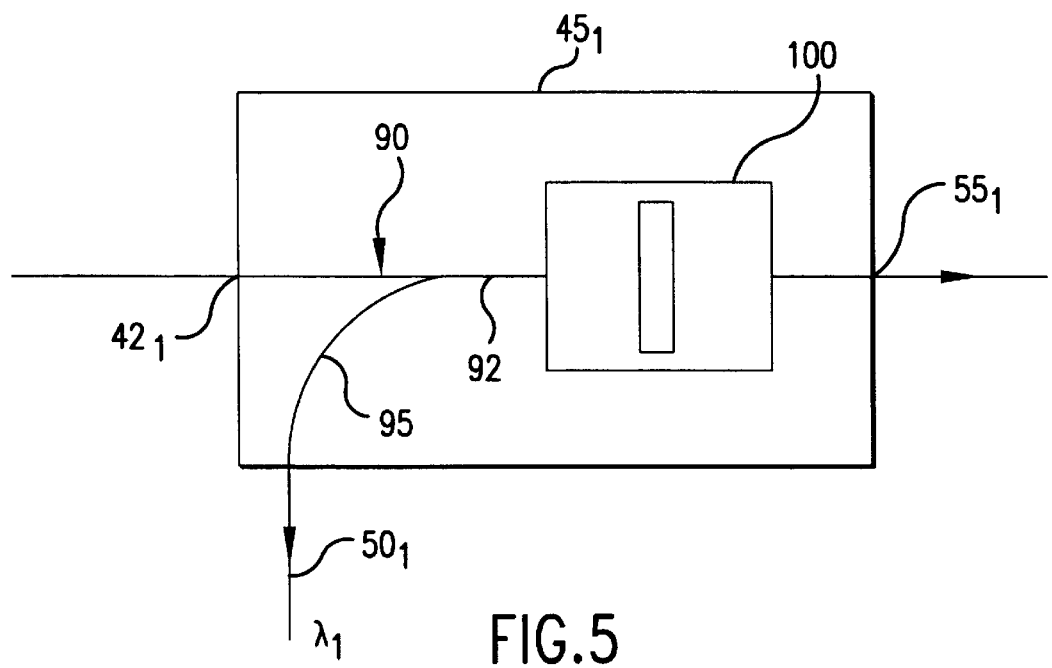
FIG. 5 schematically illustrates an alternative embodiment of a wavelength branching unit in accordance with the present invention.

FIG. 5 schematically illustrates an alternative embodiment of a wavelength branching unit $45_1$ as an example of the wavelength branching units $45_1 \ldots 45_N$ in accordance with the present invention. Input port $42_1$ is coupled to transmission path 35 and receives the multiplexed optical signal. Wavelength branching unit $45_1$ includes an optical coupler 90 which supplies the multiplexed signal to filtering element 100. Filtering element 100 is configured to reflect one or more channels from the received multiplexed signal having wavelengths $\lambda_1 \ldots \lambda_N$, for example, channel having wavelength $\lambda_1$ and supplies it to coupler 90 by way of optical path 92. Filtering element 100 can be, for example a Fabry-Perot filter, a fiber grating, etc. The reflected wavelength $\lambda_1$ is supplied to path $50_1$ via coupler path 95. The remaining channels having wavelengths $\lambda_2 \ldots \lambda_N$ pass-through filtering element 100 to port $55_1$.

Figure 6:
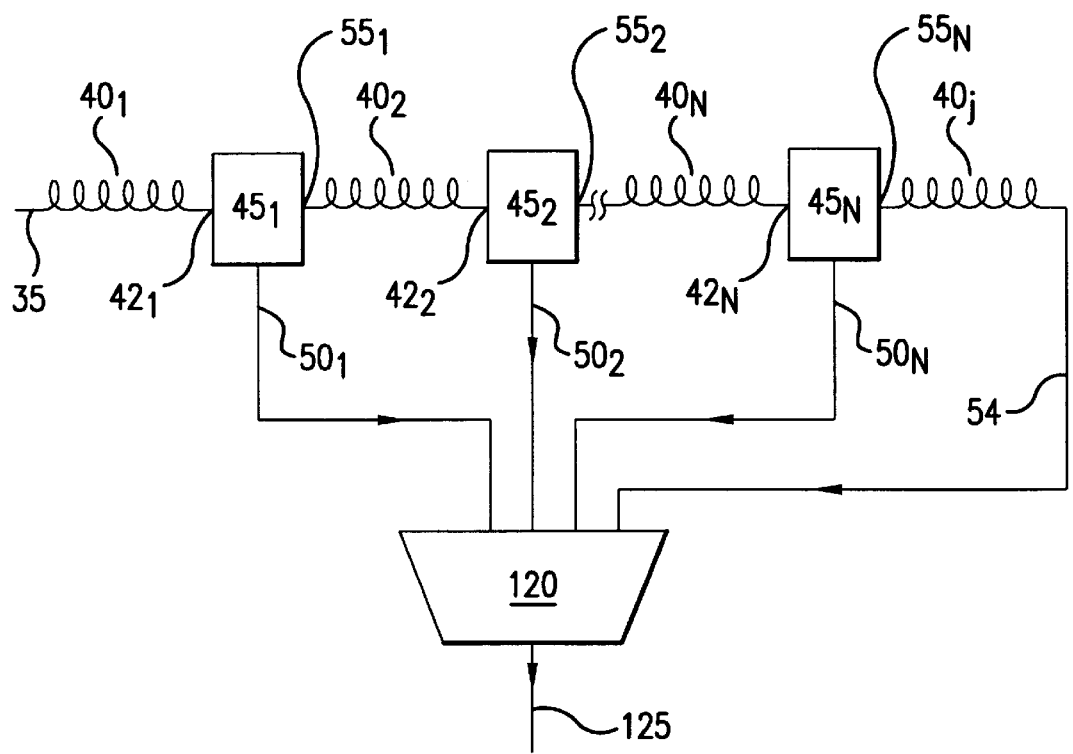
FIG. 6 schematically illustrates an optical device in accordance with the present invention.

FIG. 6 schematically illustrates an optical device where the dispersion compensation can be performed, for example, at the transmitting end and/or disposed along a transmission path within a communications system. In this configuration, after the plurality of channels at differing wavelengths propagate through their respective lengths of dispersion compensating fiber, the channels are supplied to a multiplexer for subsequent transmission. In particular, one or more segments of dispersion compensating fiber $40_1 \ldots 40_j$ are disposed between wavelength branching units $45_1 \ldots 45_N$, respectively. A multiplexed optical signal having a plurality of channels at wavelengths $\lambda_1 \ldots \lambda_N$, and $\lambda_j$ are carried over path 35. Segments of dispersion compensating fiber $40_1 \ldots 40_N$, $40_j$ have associated lengths which correspond the an adequate compensation length for a particular wavelength as described above. After each of the wavelength branching units $45_1 \ldots 45_N$ selects one or more of the multiplexed optical channels having wavelengths $\lambda_1 \ldots \lambda_N$, each channel is supplied to optical paths $50_1 \ldots 50_N$. The channel or channels not selected by each branching unit $45_1 \ldots 45_N$ continue to propagate to the next branching unit. The remaining channel, for example $\lambda_j$ not selected by any of the branching units $45_1 \ldots 45_N$, is supplied to fiber segment $40_j$ coupled to output port $55_N$ of branching unit $45_N$. Each of the selected channels are then supplied to multiplexer 120 where they are multiplexed and supplied to path 125 for subsequent propagation.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device comprising:

an optical communication path carrying a plurality of optical signals, each at a respective one of a plurality of wavelengths;

a plurality of optical branching units coupled in series along said optical communication path;

a plurality of dispersion compensating fiber segments respectively coupled to corresponding ones of said plurality of optical branching units, each of said plurality of optical signals propagating through at least one of said plurality of dispersion compensating fiber segments; and an optical multiplexer having a plurality of input ports and an output port, each of said plurality of input ports being coupled to a respective one of said plurality of optical branching units to receive a corresponding one of said plurality of optical signals from a respective one of said optical branching units, each of said plurality of optical signals being output through said output port of said optical multiplexer.

2. An optical device in accordance with claim 1, wherein each of said plurality of optical branching units includes a circulator coupled to an in-fiber Bragg grating.

3. An optical device in accordance with claim 1, wherein each of said plurality of optical branching units includes an optical filter.

* * * * *